United States Patent
Franke et al.

(10) Patent No.: US 7,587,133 B2
(45) Date of Patent: Sep. 8, 2009

(54) METHOD FOR STARTING A CONTINUOUS STEAM GENERATOR AND CONTINUOUS STEAM GENERATOR FOR CARRYING OUT SAID METHOD

(75) Inventors: Joachim Franke, Altdorf (DE); Rudolf Kral, Stulln (DE); Dieter Schiesser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 505 days.

(21) Appl. No.: 10/570,653

(22) PCT Filed: Aug. 2, 2004

(86) PCT No.: PCT/EP2004/008655

§ 371 (c)(1),
(2), (4) Date: Mar. 3, 2006

(87) PCT Pub. No.: WO2005/028957

PCT Pub. Date: Mar. 31, 2005

(65) Prior Publication Data

US 2007/0028859 A1 Feb. 8, 2007

(30) Foreign Application Priority Data

Sep. 3, 2003 (EP) .................................. 03020020

(51) Int. Cl.
*F22B 1/20* (2006.01)
*F22B 3/12* (2006.01)
*F22D 1/00* (2006.01)

(52) U.S. Cl. ......................... 392/386; 122/1 C; 122/460

(58) Field of Classification Search ................... 99/324; 392/386–406, 478–496; 122/1 C, 1 R, 209.1–220, 122/235.11–235.15, 459–461
See application file for complete search history.

(56) References Cited

U.S. PATENT DOCUMENTS 4,205,633 A 6/1980 Wittchow (Continued)

FOREIGN PATENT DOCUMENTS

DE 19700350 A1 7/1998

(Continued)

OTHER PUBLICATIONS

J. Franke et al., "Materialschonender Betrieb Von Dampferzeugern", VGB Kraftwerkstechnik GmbH, Essen, Germany, vol. 77, No. 2, 1997, pp. 104-108, XP000679260.

*Primary Examiner*—Sang Y Paik

(57) ABSTRACT

The invention relates to a continuous steam generator provided with an evaporator through flow heating surface which is disposed in a heating gas channel which can be cross flown in an approximately vertical manner in a heating gas device, said evaporator through flow heating surface comprising a plurality of parallel connected steam generating pipes enabling a flow medium to flow through, and an overheating heating surface which is arranged downstream from the evaporator through flow heating surface comprising a plurality of parallel connected overheating pipes enabling the evaporated flow medium to flow through, also enabling production and operational costs to be reduced and enabling the temperature of the steam on the outlet of the overheating heating surface to be controlled in a comparatively simple and flexible manner. The steam end-point of the flow medium is displaced to the overheating pipe, if required. The continuous heating surfaces and the overheating heating surfaces are combined to form one functional unit such that the overheating heating surface can be used as a steam heating surface in a continuous steam generator which is particularly suitable for carrying out said method.

10 Claims, 1 Drawing Sheet

U.S. PATENT DOCUMENTS

| | | | |
|---|---|---|---|
| 5,159,897 A * | 11/1992 | Franke et al. | 122/367.3 |
| 5,568,793 A | 10/1996 | Ziegler | |
| 5,979,370 A | 11/1999 | Franke | |
| 6,019,070 A * | 2/2000 | Duffy | 122/209.1 |
| 6,092,490 A * | 7/2000 | Bairley et al. | 122/7 R |
| 6,311,647 B1 * | 11/2001 | Liebig et al. | 122/479.1 |

FOREIGN PATENT DOCUMENTS

| | | |
|---|---|---|
| EP | 0 944 801 B1 | 2/2001 |
| EP | 1 288 567 A1 | 3/2003 |
| JP | 60178203 A | 9/1985 |
| JP | 61279704 A | 12/1986 |
| JP | 62161691 A | 7/1987 |
| JP | 2002168405 A | 6/2002 |
| TW | 313620 | 8/1997 |
| TW | 296427 | 8/2006 |

* cited by examiner

METHOD FOR STARTING A CONTINUOUS STEAM GENERATOR AND CONTINUOUS STEAM GENERATOR FOR CARRYING OUT SAID METHOD

CROSS REFERENCE TO RELATED APPLICATION

This application is the US National Stage of International Application No. PCT/EP2004/008655, filed Aug. 02, 2004 and claims the benefit thereof. The International Application claims the benefits of European Patent application No. 03020020.8 EP filed Sep. 3, 2003, both of the applications are incorporated by reference herein in their entirety.

FIELD OF THE INVENTION

The invention relates to a continuous-flow steam generator of the horizontal type of construction, in which there are arranged, in a heating gas duct through which the flow can pass in an approximately horizontal heating gas direction, an evaporator continuous-flow heating surface, which comprises a number of steam generator tubes connected in parallel to allow a flow medium to flow through, and a superheater heating surface which is connected downstream of the evaporator continuous-flow heating surface and which comprises a number of superheater tubes connected in parallel to allow the evaporated flow medium to flow through. The invention further relates to a method for starting a continuous-flow steam generator of this type.

BACKGROUND OF THE INVENTION

A steam generator of said type is known for example from EP 1 288 567 A1.

In a gas and steam turbine plant, the heat contained in the expanded working medium or heating gas from the gas turbine is utilized for the generation of steam for the steam turbine. The heat is transmitted in a waste-heat steam generator which is connected downstream of the gas turbine and in which a number of heating surfaces for water preheating, for steam generation and for steam superheating are normally arranged. The heating surfaces are connected into the water/steam circuit of the steam turbine. The water/steam circuit conventionally comprises a plurality of, for example three, pressure stages, and each pressure stage may have an evaporator heating surface.

Several alternative implementation concepts, more specifically implementation as a continuous-flow steam generator or implementation as a circulating-flow steam generator, come under consideration for the steam generator connected downstream of the gas turbine as a waste-heat steam generator on the heating gas side. In the case of a continuous-flow steam generator, the heating of steam generator tubes provided as evaporator tubes leads to an evaporation of the flow medium in the steam generator tubes in a once-only pass. In contrast thereto, in the case of a natural or forced circulation steam generator, the circulated water is only partially evaporated during a pass through the evaporator tubes. After the generated steam has been separated, the water that did not evaporate during this process is supplied once again to the same evaporator tubes for further evaporation, the evaporated fraction being replaced by the water newly supplied to the evaporation system.

In contrast to a natural or forced circulation steam generator, a continuous-flow steam generator is not subject to any pressure limitations, so that fresh steam pressures well above the critical pressure of water ($P_{crit} \approx 221$ bar), where there are still only slight density differences between a liquid-like and a steam-like medium, are possible. A high fresh steam pressure is conducive to high thermal efficiency and therefore low $CO_2$ emissions of a fossil-fired power station. Moreover, as compared with a circulating-flow steam generator, a continuous-flow steam generator has a simple type of construction and can therefore be produced with a particularly low outlay. The use of a steam generator designed on the continuous-flow principle as a waste-heat steam generator of a gas and steam turbine plant is therefore especially beneficial for achieving a high overall efficiency of the gas and steam turbine plant along with a simple type of construction.

Particular advantages as regards the outlay in terms of production, but also as regards maintenance work which is required are afforded by a waste-heat steam generator of the horizontal type of construction, in which the heating medium or heating gas, that is to say the exhaust gas from the gas turbine, is routed through the steam generator in an approximately horizontal flow direction. Such a steam generator is known, for example, from EP 0 944 801 B1.

For efficiency or emission reasons, when a steam generator is being started it is desirable to have as short a startup time, as it is known, as possible, that is to say the time until full-load conditions and a thermal equilibrium of the plant components, along with full heating, are reached. A gas turbine requires a comparatively short time for the starting operation or for load change operations. The exhaust gas from a gas turbine can thus reach a high temperature relatively quickly. A short startup time of a gas turbine is desirable because it results in the starting losses occurring during the starting operation and consequently the emissions of the gas turbine being kept low.

If, as is the case in gas and steam turbine plants, a steam turbine is connected downstream of the gas turbine on the heating gas side, the waste heat from the gas turbine is utilized as heating gas in the steam generator of the steam turbine. For technical reasons, in particular due to the thermal inertia of its large masses, the steam turbine requires a longer startup time than the gas turbine and therefore predetermines the lower limit for the necessary startup times. Since the gas turbine therefore "leads" the steam turbine, the waste heat from the gas turbine cannot be absorbed completely by the steam circuit of the steam turbine during the startup operation of the gas and steam turbine plant. For this reason, during the operation of starting the gas and steam turbine plant the major part of the hot steam is usually routed past the steam turbine into the condenser via what is known as a bypass system. During this operation the steam turbine is carefully warmed up by means of a small portion of the steam flow so as to avoid high rates of temperature change which would lead to inadmissible material stresses. Only after this comparatively lengthy warming-up operation of the steam turbine can the latter be acted upon by the full steam volume and make its contribution to the overall power output of the plant. Consequently, only the gas turbine power output is available for a certain period of time during a starting operation.

In order to keep this period of time particularly short or even avoid it completely if at all possible, the steam produced in the steam generator can be cooled before it leaves the steam generator to a temperature level approximating to the material temperatures of the steam turbine plant. This cooling is the more complicated, the further the gas turbine "leads" the steam turbine during startup.

The cooling is typically accomplished using an injection cooling means within the superheater heating surfaces connected downstream of the continuous-flow heating surfaces of the steam generator during the startup operation of the gas and steam turbine plant. However, the temperature of the steam when it emerges from the superheater can be controlled only within certain limits with the aid of injection cooling, with the result that even with measures of this type a certain warming-up time for the steam turbine still generally remains. Moreover, the use of the separate cooling device is technically complex.

SUMMARY OF THE INVENTION

The object on which the invention is based is therefore to specify a method for starting a continuous-flow steam generator of the abovementioned type, by means of which, using comparatively simple means, the temperature of the steam emerging from the tubes of the superheater heating surface can be reliably controlled and comparatively short startup times can be achieved. A continuous-flow steam generator of the abovementioned type which is particularly suitable for performing the method will also be specified.

With regard to the method, this object is achieved according to the invention in that the evaporation end point of the flow medium is temporarily shifted into the superheater tubes.

In this case the invention proceeds from the consideration that in order to reduce the technical overhead in terms of the assembly and operation of the steam generator, the cooling of the superheating heating surface that is necessary to enable short startup times of the gas turbine should take place in a particularly simple way. Separate cooling devices such as, for example, injection coolers should therefore be avoided as far as possible. A possible way to save investing in separate cooling devices is the following: in order to avoid an excessive heating of the steam, a portion of the flow medium that has not yet evaporated after passage through the evaporator heating surface and is therefore still in the liquid state is provided to flow through the superheater heating surfaces. For this purpose, a water/steam mixture should be introduced into the tubes of the superheater heating surface, which can be achieved by means of an increased feed water supply. In order to allow this, the evaporator heating surface and the superheater heating surface should be combined into a functional unit. This makes it possible to have a direct flow of the liquid-medium/steam mixture out of the evaporator tubes over into the superheater tubes. The evaporation end point for the flow medium is thus shifted, as required, into the tubes of the superheater heating surface.

The temperature of the steam supplied to the steam turbine at the exit of the superheater heating surface can in this case advantageously be controlled directly via the feed water flow. This makes it possible to ensure, for example during the starting operation or during a load change of the gas and steam turbine plant, that there is, within the steam generator tubes of the superheater heating surface, sufficient liquid medium which, without a rise in temperature, absorbs heat through evaporation and consequently reduces the superheating of the steam at the exit of the superheater heating surface. By contrast, during the normal operation of the plant, when the temperatures of the metal masses of the steam turbine are assimilated to the high steam temperatures, the low temperature of the steam is not required and it is sufficient to place the evaporation end point of the flow medium at the exit of the evaporator continuous-flow heating surface, for example. This enables the steam temperature at the exit of the steam generator to be adjusted in a particularly simple and at the same time highly flexible manner to the operating state of the steam turbine.

The position of the evaporation end point within the superheater heating surface or the evaporator heating surface is beneficially controlled via the amount of supply of flow medium per unit time. In this way the evaporation end point can be coordinated with the temperature requirements of the steam turbine in a particularly simple and flexible way. To achieve low steam temperatures, an increased supply of flow medium can be used, for example during the startup operation of the gas and steam turbine plant, to increase the proportion of flow medium not yet evaporated within the superheater heating surface quickly and without additional devices for the cooling of initially highly superheated steam.

With regard to the continuous-flow steam generator, the object is achieved according to the invention in that the evaporator heating surface and the superheater heating surface of the steam generator are interconnected into a functional unit in such a way that the evaporation end point of the flow medium can be displaced into the superheater heating surface.

The use, as and when required, of the superheater heating surface as an evaporator heating surface ensures the particularly flexible and uncomplicated operation of the steam generator in different operating states of the gas and steam turbine plant. During normal operation of the gas and steam turbine plant it is not necessary and, for reasons of efficiency, not even desirable to utilize the superheater heating surface of the steam generator as an evaporator heating surface. Rather, the steam generator should be designed in such a way that the flow medium has already evaporated completely at the exit of the evaporator heating surface in order subsequently to be superheated in the tubes of the superheater heating surface downstream of the evaporator heating surface on the flow medium side. During the startup operation of the gas and steam turbine plant, on the other hand, it is desirable for unevaporated flow medium to pass into the superheater and evaporate there, that is to say to absorb latent heat, and in so doing lower the temperature of the steam at the exit of the superheater heating surface. The interconnection, provided for this purpose, of the evaporator continuous-flow heating surface and the superheater heating surface on the flow medium side is in this case preferably implemented by consciously dispensing with an interconnection of the water separator typically provided between the evaporator heating surface and the superheater heating surface.

Because the continuous-flow heating surface and the superheater heating surface are combined into one unit, there is no longer any need to use a common outlet header for the steam flows from the parallel tubes, on the heating gas side, of a tube row of the evaporator heating surface and for a redistribution of the flow to the parallel tubes of the superheater heating surface. In contrast it is preferably provided that the superheater tubes are preceded on the flow medium side in each case by a number of individually assigned steam generator tubes in the manner of individual sections connected in parallel on the flow medium side and without partial transverse communication, so that no redistribution of the flow medium at all is carried out between the evaporator heating surface and superheater heating surface. There is therefore also no risk of a segregation of the liquid and the steam phase of the flow medium. Overfeeding the evaporator, that is to say increasing the supply of flow medium such that the flow medium cannot evaporate completely within the tubes of the evaporator heating surface, and transferring the liquid-medium/steam mixture out of the tubes of the evaporator heating surface into those of the superheater heating surface are consequently possible without difficulty and can thus be used to lower, as and when required, the steam temperatures at the exit of the superheater heating surface during startup or during load changes.

The convergence of the flow from steam generator tubes connected in parallel on the flow medium side and arranged one behind the other on the heating gas side in the manner of a tube line and the transfer into the superheated tubes beneficially take place in each case by means of a suitably designed header/distributor unit, whereby a common header oriented with its longitudinal axis essentially parallel to the heating gas direction is in each case connected downstream of steam generator tubes connected in parallel on the flow medium side and arranged one behind the other on the heating gas side. In this case the number of headers is conveniently equal to the number of steam generator tubes arranged within a tube row extending transversely to the heating gas direction, so that each steam generator tube within a tube row is uniquely assigned precisely one header.

A separator is advantageously connected downstream of the superheater heating surface on the flow medium side. The separator ensures that flow medium which may not yet have evaporated, that is to say is still liquid even after passing through the superheater heating surface, cannot pass into the steam turbine.

A particularly high degree of flow stability and a particularly favorable heating profile can be achieved with only a small amount of overhead in structural and design terms in that provision is made for the steam generator tubes of the continuous-flow heating surface to be advantageously subdivided into in each case at least three segments (of parallel tubes), the first segment of each tube comprising a rising tube piece and having the flow passing through it in the upward direction. Analogously, the second segment comprises a falling tube piece and has the flow passing through it in a downward direction. In this case the falling tube pieces of each steam generator tube which form the second segment are arranged in the heating gas duct in each case downstream of the rising tube pieces assigned to them, as seen in the heating gas direction. The third segment comprises further rising tube pieces and has the flow passing through it in the upward direction.

In this case the segments of the steam generator tube or of each steam generator tube are advantageously positioned in the heating gas duct in such a way that the heating requirement of each individual segment is matched to a special degree to the local heat availability in the heating gas duct. For this purpose, the further rising tube pieces of each steam generator tube which form the third segment arranged in the heating gas duct in each case between the rising tube pieces of the first segment which are assigned to them and the falling tube pieces of the second segment which are assigned to them, as seen in the heating gas direction. In an arrangement of this type, therefore, the in each case first rising tube piece, which serves for partial preheating and largely already for the evaporation of the flow medium, is exposed to comparatively high heating by the heating gas in the "hot smoke gas region". This ensures that flow medium flows out of the respective first rising tube piece with a comparatively high steam content in the entire load range. The result of this, during subsequent introduction into the downstream falling tube piece, is that a rise of steam bubbles counter to the flow direction of the flow medium, said rise being unfavorable for flow stability, is consistently avoided in the falling tube piece. Due to the arrangement of the falling tube piece in the "cold smoke gas region" and to the arrangement of the further rising tube piece between the first rising tube piece and the falling tube piece, an especially high efficiency of the evaporator heating surfaces is therefore ensured by the high flow stability achieved in this way.

The steam generator is beneficially used as a waste-heat steam generator of a gas and steam turbine plant. In this case a gas turbine is advantageously connected downstream of the steam generator on the heating gas side. In this connection arrangement, additional firing for increasing the heating gas temperature may beneficially be provided downstream of the gas turbine.

The advantages achieved by means of the invention are in particular that the utilization of the actual flow medium makes it possible in a particularly simple and technically uncomplicated way to adjust the temperature of the steam at the exit of the superheater heating surface particularly flexibly to the operating state of the steam turbine during the startup operation, so that the waiting time until the steam turbine is acted upon by steam for power output and the associated delay in power output during starting can be kept particularly low in an especially simple way.

It is particularly advantageous in this case to dispense with complex separate cooling devices such as, for example, an injection cooling means. The use of the liquid portion of the flow medium and its capacity to absorb latent heat make it possible in an especially flexible and simple way to control and, where required, to lower the temperature of the steam at the exit of the superheater heating surface. At the same time the cooling of hot steam carried out during injection cooling, together with subsequent reheating, is no longer required.

BRIEF DESCRIPTION OF THE DRAWINGS

An exemplary embodiment of the invention is explained in more detail with reference to a drawing, in which.

DETAILED DESCRIPTION OF THE INVENTION

Figure 1:
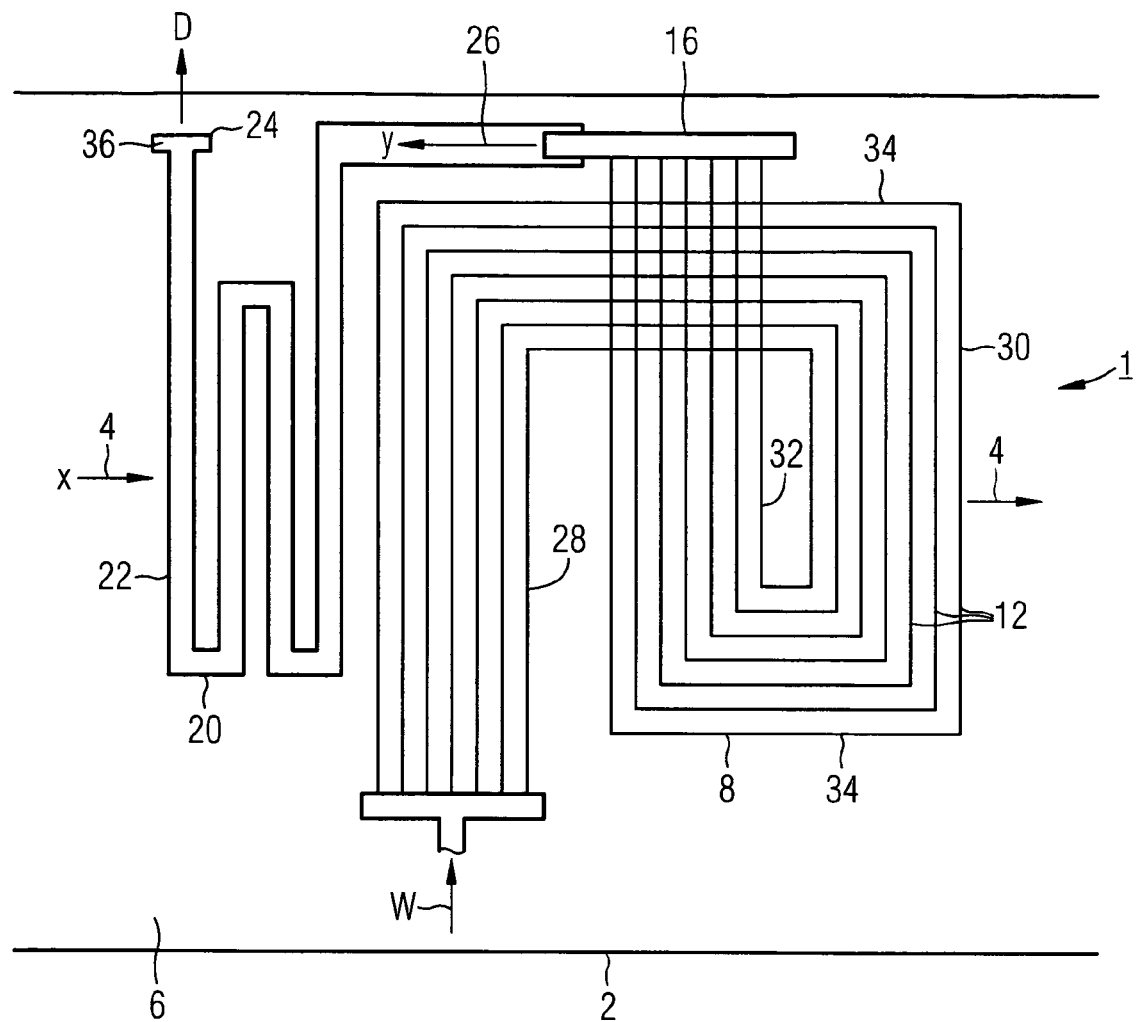
FIG. 1 shows, in longitudinal section, a simplified illustration of a continuous-flow steam generator of the horizontal type of construction.

The continuous-flow steam generator 1 according to FIG. 1 is connected downstream of a gas turbine (not shown in any more detail) on the exhaust gas side in the manner of a waste-heat steam generator. The continuous-flow steam generator 1 has a containment wall 2 which forms a heating gas duct 6 through which the flow is capable of flowing in an approximately horizontal heating gas direction x, indicated by the arrows 4, for the exhaust gas from the gas turbine. A number of heating surfaces, configured on the continuous-flow principle, for the preheating, evaporation and superheating of the flow medium are arranged in each case in the heating gas duct 6. In the exemplary embodiment according to FIG. 1, only one evaporator continuous-flow heating surface 8 is shown for the evaporation section, but a larger number of continuous-flow heating surfaces may also be provided.

The evaporator system formed from the evaporator continuous-flow heating surface 8 can be acted upon by flow medium W which, during normal load operation, is evaporated completely during a once-only pass through the evaporator continuous-flow heating surface 8.

The evaporator system formed from the evaporator continuous-flow heating surface 8 is connected into the water/steam circuit (not shown in any more detail) of a steam turbine.

The evaporator continuous-flow heating surface 8 of the continuous-flow steam generator 1 according to FIG. 1 comprises, in the manner of a tube group, a plurality of steam generator tubes 12 connected in parallel to allow the flow medium W to flow through. In this arrangement, a plurality of steam generator tubes 12 are in each case disposed next to one another, as seen in the heating gas direction x, such that what are known as tube rows are formed. Thus, in each case only one of the steam generator tubes 12 arranged next to one another in this way can be seen in FIG. 1. A plurality of steam generator tubes 12 are arranged one behind the other, as seen in the heating gas direction x, and consequently form what is known as a tube line. A common header 16 is connected here downstream of the steam generator tubes 12 arranged in a tube line in each case on the flow medium side.

A superheater heating surface 20, likewise arranged in the heating gas duct 6, is connected downstream of the evaporator continuous-flow heating surface 8 on the flow medium side. In addition to the evaporator system and the superheater heating surface 20, the water/steam circuit of the steam turbine has connected into it a number of further heating surfaces (not shown in FIG. 1) which may be, for example, medium-pressure evaporators, low-pressure evaporators and/or preheaters.

The continuous-flow steam generator 1 is designed for reliably ensuring, by particularly simple means, low steam temperatures at the exit of the superheater tubes 22 forming the superheater heating surface 20 during the startup operation. For this purpose there is provision to shift the evaporation end point of the flow medium W as required from the steam generator tubes 12 into the superheater tubes 22, so that, owing to the residual evaporation in the superheater tubes 22, particularly in the startup or part-load range, particularly low superheating can be achieved by suitable setting of the feed of flow medium W to the steam generator tubes 12.

For this purpose the headers 16 are designed in such a way that they allow the completely or partially evaporated flow medium W to flow over into the superheater heating surface 20 connected downstream of the evaporator continuous-flow heating surface 8, without the liquid phase and the steam phase of the flow medium W being segregated in the process. The header/distributor unit thus connects the evaporator continuous-flow heating surface 8 and the superheater heating surface 20 into a functional unit in such a way that the evaporation end point of the flow medium W can be displaced into the superheater heating surface 20.

During normal operation, the steam D generated in the evaporator unit from the flow medium W is superheated in the superheater tubes 22 forming the superheater heating surface 20. The number of superheater tubes 22 arranged next to one another in the heating gas direction x corresponds to the number of tube lines of the evaporator system. The steam D generated in the steam generator tubes 12 of a tube line is therefore collected in each case in a header 16 and supplied in each case to one or two superheater tubes 22, so that each superheater tube 22 is preceded on the flow medium side in each case by a number of individually assigned steam generator tubes 12. The direct flow, produced by this arrangement, out of the evaporator system over into the superheater tubes 22, without a separator connected between the evaporator system and superheater heating surface 20, allows the controlled transfer of not yet evaporated, that is to say still liquid flow medium W out of the evaporator system into the superheater tubes 22. Owing to the shift, realized in this way, of the evaporation end point of the flow medium W out of the evaporator system into the superheater tubes 22, it is possible to achieve a lowering of the temperature of the steam D at the exit 24 of the superheater tubes 22 which is desired depending on the operating state of the gas and steam turbine plant. This takes place due to the evaporation of the liquid medium portion in the superheater tubes 22, that is to say, the use, as and when required, of the superheater heating surface 20 as an evaporator heating surface.

Particularly during startup or load change operations of the gas and steam turbine plant, a lowering of the temperature of the steam D at the exit 24 of the superheater tubes 22 is required, since the steam turbine, due to its sluggish behavior compared with that of the gas turbine, does not allow the steam temperatures to follow the exhaust-gas temperatures quickly during starting. By the superheater heating surface 20 being utilized as required as an evaporator heating surface, the temperature of the steam D at the exit 24 of the superheater heating surface 20 can be adjusted in an especially simple and flexible way to the lower temperature of the metal masses of the steam turbine, that is to say can be lowered.

An especially flexible setting of the steam temperature T at the exit 24 of the superheater heating surface 20 is ensured in that the evaporation end point can be displaced within the superheater tubes 22 in the flow direction y, identified by the arrow 26, of the flow medium W. An evaporation end point lying comparatively far forward in the flow direction y, that is to say in the vicinity of the headers 16, signifies a low heat absorption capacity of the liquid-medium/steam mixture within the superheater heating surface 20 and consequently a comparatively high temperature T of the steam D at the exit 24 of the superheater heating surface 20. If, however, the evaporation end point is displaced comparatively far into the superheater tubes 24 in the flow direction y, that is to say the flow medium W evaporates completely only comparatively late, then the heat absorption capacity of the liquid-medium/steam mixture within the superheater heating surface 20 is high and the temperature T of the steam D at the exit 24 of the superheater heating surface 20 is comparatively low.

In the exemplary embodiment, the position of the evaporation end point in the flow direction y and consequently the temperature T of the steam D at the exit 24 of the superheater heating surface 20 are controlled via the supply of flow medium W to the steam generator tubes 12, that is to say via the feed water stream. For this purpose, the pump power of the feed water pumps is activated accordingly by a central monitoring and control unit. When a comparatively large quantity of flow medium W per unit time is supplied to the steam generator tubes 12, the amount of heat made available by the heating gas is not sufficient to evaporate the flow medium W completely within the evaporator continuous-flow heating surface 8. Thus, the greater the quantity of flow medium W supplied per unit time to the steam generator tubes 12, the higher is the liquid medium portion in the liquid-medium/steam mixture which passes out of the evaporator system into the superheater tubes 22 via the header/distributor unit. A high liquid medium portion in turn requires a comparatively high heat absorption capacity of the liquid-medium/steam mixture and a comparatively low exit temperature T. Thus, in an especially simple and flexible way, a lowering of the temperature T of the steam D supplied to the steam turbine can be achieved solely by an increase in the supply of flow medium W per unit time and, conversely, an increase in the temperature T can be achieved solely by a lowering of the supply.

Furthermore, the evaporator continuous-flow heating surface 8 is designed for an especially favorable heating characteristic. In order to ensure this in an especially reliable way by particularly simple structural means, the evaporator continuous-flow heating surface 8 comprises three segments connected in series on the flow medium side. In the first segment, each steam generator tube 12 of the evaporator continuous-flow heating surface 8 in this case comprises an approximately vertically arranged rising tube piece 28 through which the flow medium W is capable of flowing in the upward direction. In the second segment, each steam generator tube 12 comprises an approximately vertically arranged falling tube piece 30 which is connected downstream of the rising tube piece 28 on the flow medium side and through which the flow medium W is capable of flowing in the downward direction. In the third segment, each steam generator tube 12 comprises an approximately vertically arranged further rising tube piece 32 which is connected downstream of the falling tube piece 30 on the flow medium side and through which the flow medium W is capable of flowing in the upward direction. The falling tube piece 30 is in this case connected to the rising tube piece 28 assigned to it via an overflow piece 34. In the same way, the further rising tube piece 32 is connected to the falling tube piece 30 assigned to it via an overflow piece 34. Viewed in the heating gas direction x, the further rising tube piece 32 is arranged between the rising tube piece 28 and the falling tube piece 30.

Figure 2:
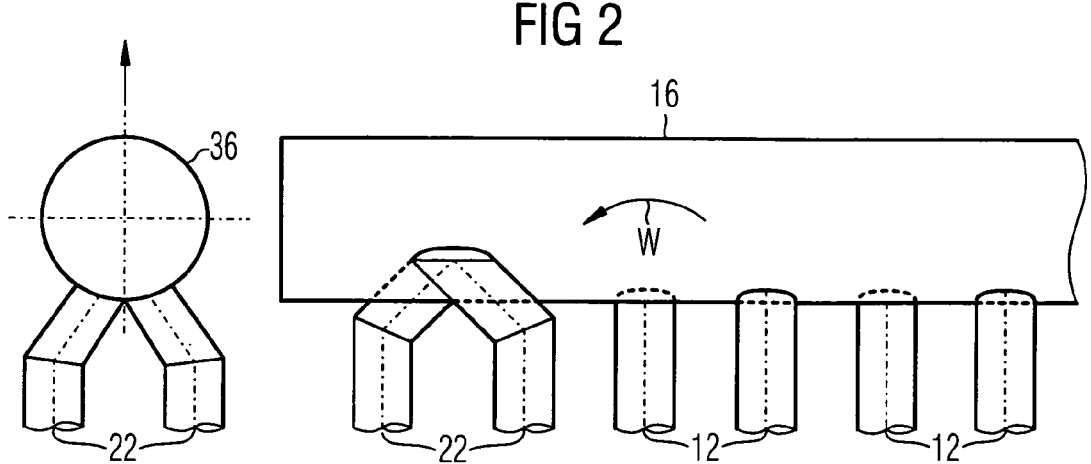
FIG. 2 shows a longitudinal section through a header of the continuous-flow steam generator.

The shift of the evaporation end point of the flow medium W out of the evaporator system into the superheater tubes 22 is made possible by the use of the headers 16 illustrated in more detail in FIG. 2. Conventionally, the flow medium W evaporated for the most part at the exit of the evaporator continuous-flow heating surface 8 is collected in an outlet header and redistributed by a distributor to the superheater tubes 22 connected downstream of the steam generator tubes 12. However, the use of a common header for the steam generator tubes 12 of a tube row and the resulting requirement for a redistribution of the flow medium W to the superheater tubes 22 give rise to the risk of an undesirable segregation of the liquid and the steam phase. If, on the other hand, as in the exemplary embodiment, common headers and distributors for steam generator tubes 12 of a tube row are dispensed with and, in their place, only one header 16 is used for steam generator tubes 12 of a tube line, this risk is no longer present. The liquid-medium/steam mixture flows without segregation out of the steam generator tubes 12 of a tube line into the header 16 and from there into the following superheater tube 22, without a redistribution of the flow medium W being necessary. The separator 36 usually connected between the evaporator system and the superheater heating surface 20 is placed at the exit 24 of the superheater tubes 22.

The invention claimed is:

1. A method for starting a power plant of the type having a gas turbine, a steam turbine and a continuous-flow steam generator, comprising:
    positioning the steam turbine downstream of the gas turbine and applying heat exhausted from the gas turbine as a heating gas in the steam generator by:
    (i) providing an evaporator continuous-flow heating surface that is arranged in a heating gas duct through which the flow is capable of flowing in an approximately horizontal heating gas direction, and which comprises a number of steam generator tubes connected in parallel to allow a flow medium to flow through; and
    (ii) providing a superheater heating surface that is connected downstream of the evaporator continuous-flow heating surface on the flow medium side and which comprises a number of superheater tubes connected in parallel to allow the evaporated flow medium to flow through, and
    (iii) positioning the evaporation end point of the flow medium in the superheater tubes to temporarily limit the temperature of the flow medium at an exit of the superheater heating surface while starting up the steam turbine.

2. The method as claimed in claim 1, wherein the temperature of the flow medium at an exit of the superheater heating surface is controlled by the selection of the position of the evaporation end point of the flow medium in the superheater heating surface.

3. The method as claimed in claim 1, wherein the evaporation end point of the flow medium is set via the feed rate of the flow medium supplied to the evaporator continuous-flow heating surface.

4. A power plant comprising a gas generator, continuous-flow steam generator coupled to generate steam with heat exhausted by the gas turbine and a steam turbine coupled to receive the generated steam, the steam generator comprising:
    a heating gas duct arranged to provide a flow in an approximately horizontal heating gas direction;
    an evaporator continuous-flow heating surface that comprises a number of steam generator tubes connected in parallel to allow a flow medium to flow therethrough; and
    a superheater heating surface connected downstream of the evaporator continuous-flow heating surface and which comprises a number of superheater tubes connected in parallel to allow the evaporated flow medium to flow therethrough,
    wherein the evaporator continuous-flow heating surface and the superheater heating surface are interconnected into a functional unit in such a way that the evaporation end point of the flow medium can be displaced into the superheater heating surface.

5. The power plant of claim 4, wherein each superheater tube is preceded on the flow medium side in each case by a number of individually assigned steam generator tubes.

6. The power plant of claim 4, wherein a common header oriented with its longitudinal axis essentially parallel to the heating gas direction is in each case connected downstream of steam generator tubes connected in parallel on the flow medium side and arranged one behind the other on the heating gas side.

7. The power plant of claim 4, wherein the number of headers is equal to the number of steam generator tubes arranged within a tube row extending transversely to the heating gas direction.

8. The power plant of claim 4, wherein a separator is connected downstream of the superheater heating surface on the flow medium side.

9. The power plant of claim 4, wherein a steam generator tube comprises an approximately vertically arranged rising tube piece through which the flow medium is capable of flowing in the upward direction and an approximately vertically arranged falling tube piece that is connected downstream of said rising tube piece on the flow medium side and in the heating gas direction and through which the flow medium is capable of flowing in the downward direction, and an approximately vertically arranged further rising tube piece which is connected downstream of said falling tube piece on the flow medium side and through which the flow medium is capable of flowing in the upward direction and that is arranged between the rising tube piece and the falling tube piece as seen in the heating gas direction.

10. The power plant of claim 4, wherein the continuous-flow steam generator is preceded on the heating gas side by the gas turbine.

* * * * *